United States Patent [19]
Palliser

[11] Patent Number: 6,019,305
[45] Date of Patent: Feb. 1, 2000

[54] COMPACT SEAT BELT PRETENSIONER

[75] Inventor: Martyn Palliser, Dalston, United Kingdom

[73] Assignee: Breed Automotive Technology, Inc., Lakeland, Fla.

[21] Appl. No.: 09/227,647

[22] Filed: Jan. 8, 1999

[30] Foreign Application Priority Data

Jan. 9, 1998 [GB] United Kingdom .................... 9800505

[51] Int. Cl.[7] .................................................. B60R 22/46
[52] U.S. Cl. ............................................ 242/374; 280/806
[58] Field of Search .......................... 242/374; 280/806; 297/478, 480; 60/632, 633, 634, 635, 636, 637, 638; 123/243

[56] References Cited

U.S. PATENT DOCUMENTS

| | | | |
|---|---|---|---|
| 4,230,288 | 10/1980 | Fohl | 242/374 |
| 5,485,970 | 1/1996 | Steffens | 242/374 |
| 5,494,014 | 2/1996 | Lobb | 123/243 |
| 5,653,398 | 8/1997 | Fohl | 242/374 |
| 5,944,276 | 8/1999 | Fohl | 242/374 |

FOREIGN PATENT DOCUMENTS

| | | | |
|---|---|---|---|
| 2535380 | 2/1977 | Germany | 242/374 |
| 2019197 | 10/1979 | United Kingdom . | |
| 2083557 | 3/1982 | United Kingdom . | |
| 9535227 | 12/1995 | WIPO . | |
| 9821075 | 5/1998 | WIPO . | |

*Primary Examiner*—John M. Jillions
*Attorney, Agent, or Firm*—Lonnie R. Drayer

[57] ABSTRACT

A seat belt pretensioner has a rotary member that is connectable to a safety belt webbing retractor. A spool and a number of vanes are hingedly attached to the rotary member at spaced positions around the circumferential periphery of the rotary member. The rotary member is rotatably mounted in a housing having a wall facing, and spirally formed with respect to, the rotational axis of the rotary member to form a circularly tapering gas chamber between the rotary member and the wall of the housing. In the event of a crash a gas generator supplies gas which impinges upon vanes attached to the rotary member and causes the rotary member to rotate.

18 Claims, 4 Drawing Sheets

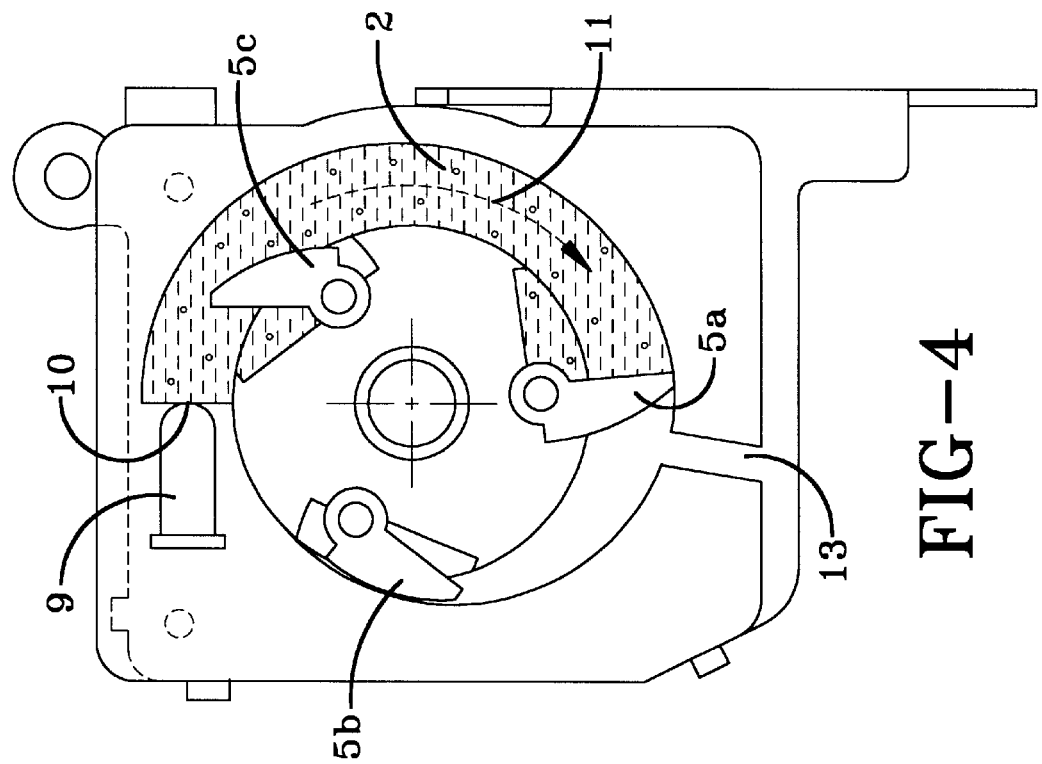
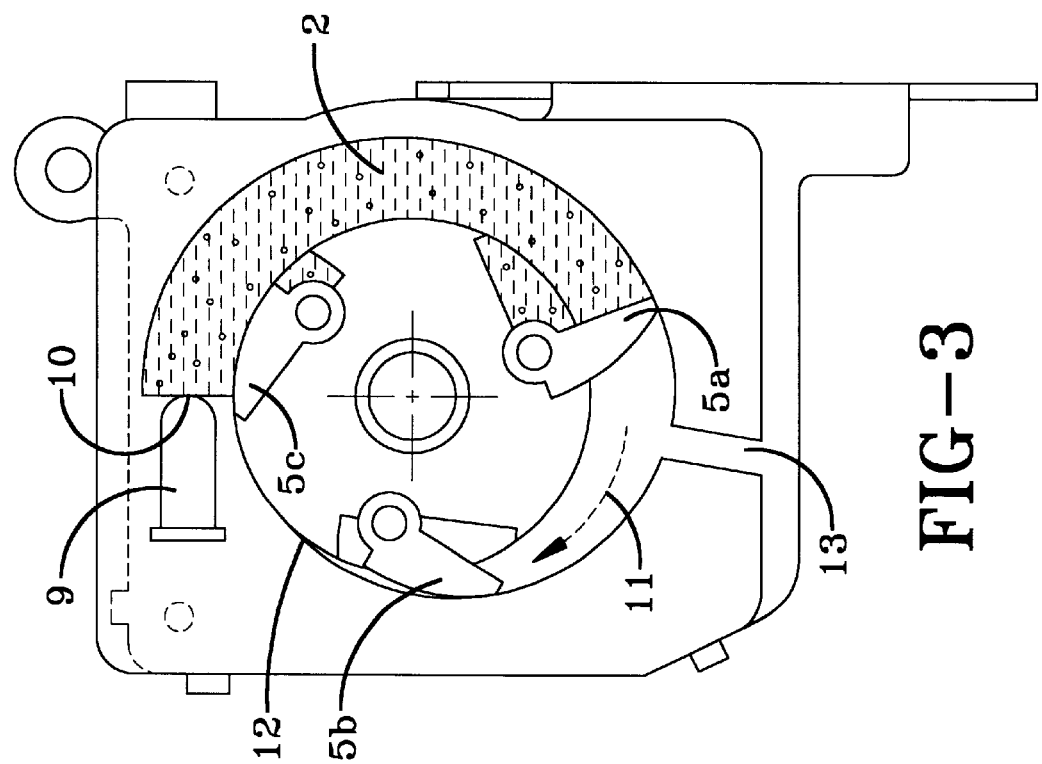

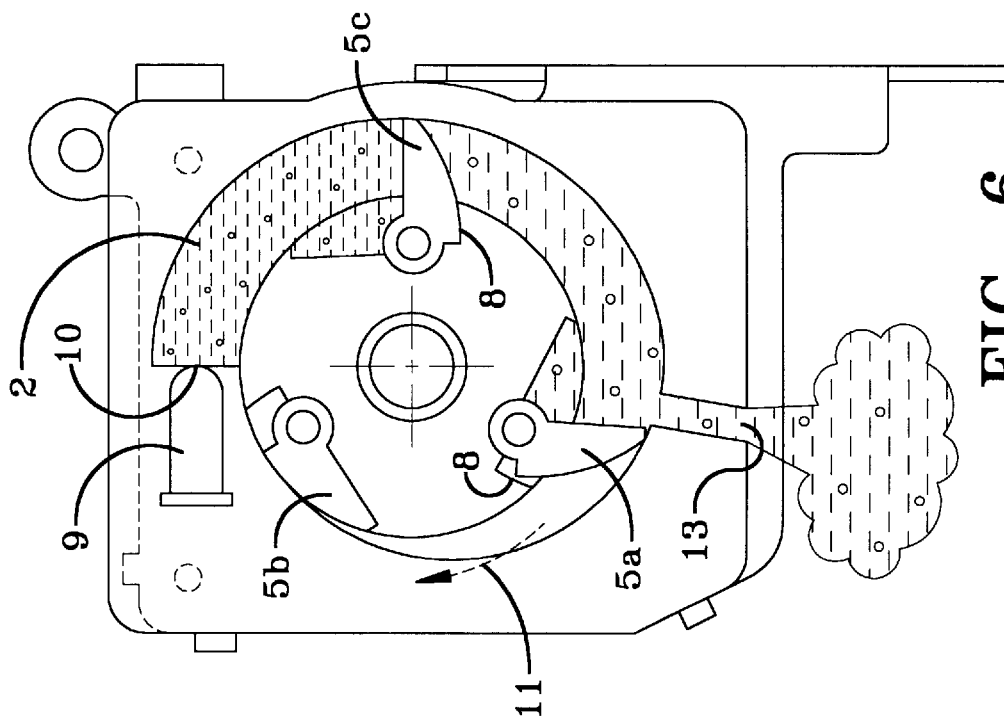
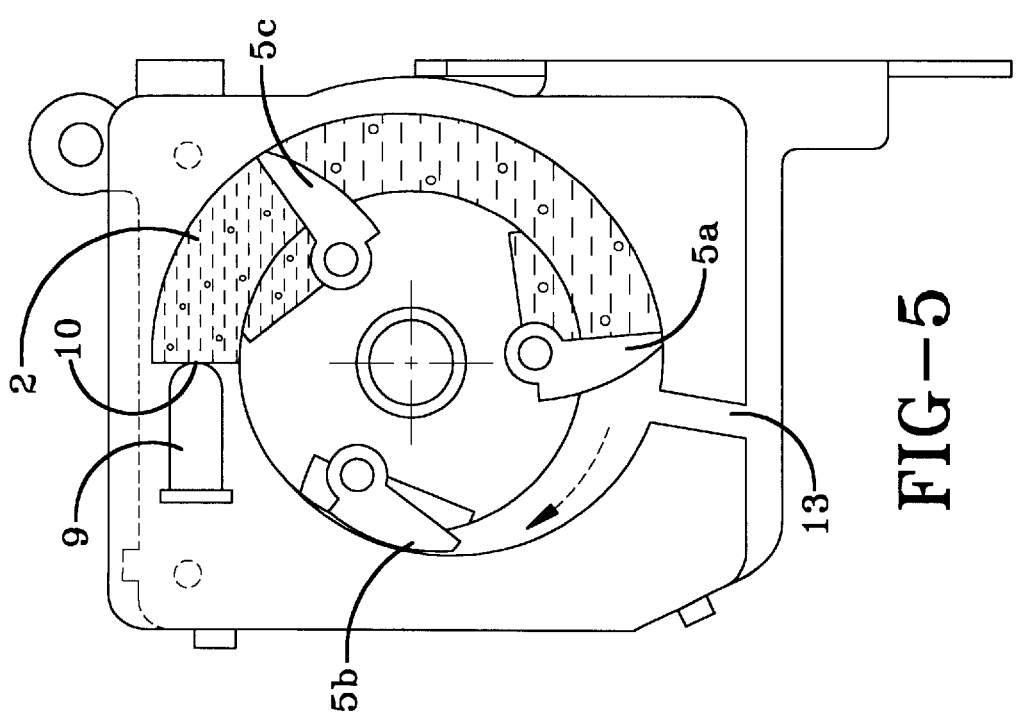

COMPACT SEAT BELT PRETENSIONER

FIELD OF THE INVENTION

The present invention relates to a pretensioner for a seat belt.

1. Background of the Invention

A pretensioner is used to rapidly take up slack in a seat belt system to more securely restrain a vehicle occupant in a crash and to more suitably position the vehicle occupant for maximum effect of a secondary restraint such as an airbag. Traditionally pretensioners use force reservoirs such as springs, or more recently pyrotechnic fired gas generators, to drive a piston along a cylinder. The piston is attached to the seat belt webbing, for example at a buckle or retractor mounting point, or is connected to rewind the spool of the retractor.

It is usually required to pull in about 180–200 mm of seat belt webbing. Using a traditional piston cylinder arrangement therefore requires a device about 180–200 mm long and this is difficult to fit discreetly in a vehicle. There is a need for more compact pretensioners.

2. Discussion of Prior Art

One example of a more compact pretensioner is described in WO 95/35227. A cylindrical chamber at the side of a retractor has vanes slidably mounted in radial slots of an eccentrically mounted rotor. A gas generator pushes the vanes and turns the motor.

This arrangement forms a more compact pretensioner but there are problems with sealing the blade against the side of the rotary housing: gas escapes and the torque generated is unsatisfactory.

SUMMARY OF THE INVENTION

The present invention aims to provide an improved, more efficient and more compact pretensioner which generates more torque for the same gas generator power and this winds back more belt, more quickly.

According to the present invention there is provided a safety restraint pretensioner comprising a rotary member, connectable to the safety restraint belt webbing retractor, spool and a plurality of vanes hingedly attached to the rotary member at spaced positions around the circumference of the rotary member, the rotary member being rotatably mounted in a housing having a wall facing, and spirally formed with respect to, the rotational axis of the rotary member to form a circularly tapering gas chamber between the rotary member and the wall of the housing.

According to a preferred embodiment the spiraling wall of the gas chamber has its smallest radius with respect to the axis of the rotary member substantially equal to the radius of the rotary member. This shape of the chamber improves its sealing. Preferably the radius changes in a stepped manner and a seal is provided in the region of the step to further improve the chamber seal.

Advantageously a vent hole is provided at a position on the circumference of the wall of the housing circumferentially spaced from the gas generator preferably at a slightly larger distance form the gas generator than the circumferential distance between two vanes.

In a preferred embodiment a plurality of gas generators may be used preferably at circumferentially spaced positions around the housing.

In one embodiment there are three vanes hinged to the outer circumference of the rotary member equidistantly spaced around its circumference, and the vent is provided generally at a position equivalent to 180° from the gas generator inlet into the passage defined by the housing wall and the rotary member.

The outer edge of each hinged vane is preferably provided with a seal, for example an elastomeric coating, which engages the outer wall of the gas chamber, when the vane is in the extended position, to seal against the outer wall and retain more gas pressure in the chamber. Preferably stops are provided on the rotary member against which the vanes are forced by the gas pressure, in their upright extended positions.

Preferably the vanes are resiliently biased to their extended positions although the gas pressure alone may in certain circumstances be sufficient to push each vane into its extended position if the geometry of the pretensioner and the gas pressure are adopted appropriately. The higher the gas pressure, the more positively the vanes are pushed into their upright position against the stops and the better the seal against the outer wall of the chamber.

The pretensioner of the present invention has advantages over the known pretensioners since it is more compact and efficient. More than one turn of the rotary member, and thus of the retractor spool, is possible without the need for complicated and expensive gearing. The gas chamber can be made an adequate size to allow for a large enough vane radius and to give sufficient surface area on the vane to reduce the pressure on the outer housing and to give enough torque. The force on the active vane is the product of the pressure and the area, and the other vanes contribute to a reaction force. However, because of the unique folding design of the vanes in the present invention, the reaction force on the other vanes is reduced, making the arrangement more efficient. In addition, the arrangement is not phase-independent. The seat belt pretensioner of the invention may for example: be used with a seat belt retractor such as that described in EP 0170432.

BRIEF DESCRIPTION OF THE DRAWINGS

For a better understanding of the present invention and to show how the same may be carried into effect, reference will be made to the accompanying drawings in which;

FIGS. 1 to 6 are cross-sectional sequence drawings of a seat belt pretensioner according to the present invention and its operation.

DETAILED DESCRIPTION OF THE INVENTION

Figure 2:
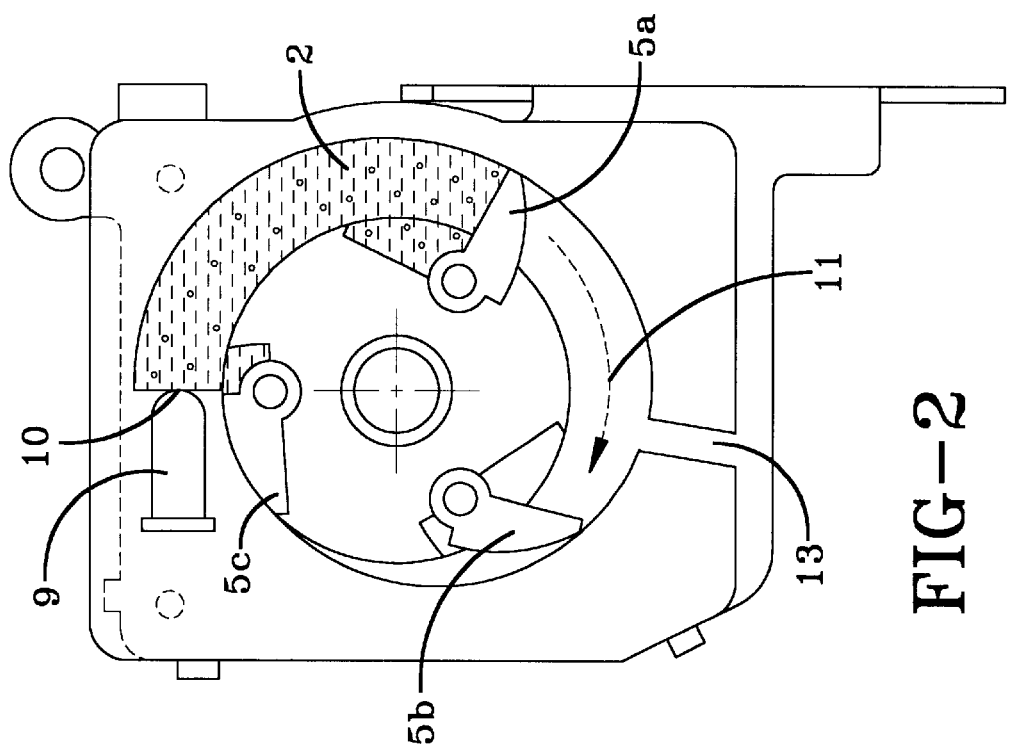

In the figures a pretensioner housing 1 has a spirally formed inner chamber 2 in which is mounted a rotary member 3 that rotates about an axis 4. The rotary member 3 is connectable via a clutch (shown in FIG. 7) to the spool of a safety belt retractor in a variety of manners well known to those skilled in the art (for example as described in EP 0600689).

Three vanes 5a, 5b, 5c are attached to the circumferential periphery of the rotary member 3. Other embodiments may use 2 or 4 or more such vanes. In any event a plurality of vanes are attached to the rotary member. As used herein and in the claims "plurality" is understood to mean two or more. These vanes are attached to the rotary member 3 by respective hinges that allow the vanes to fold into recesses 7 on the outer circumferential periphery of the rotary member 3 so as to lie flush with the outer circumferential periphery.

Each recess 7 has a back wall 8 which serves as a stop to the respective vane to prevent it from rotating further than around 90° from the flush position. Of course the exact geometry will be adapted to the particular application and other angles may be more preferred for certain circumstances.

Resilient means, such as leaf springs 14 (or alternatively rotary springs), attached at the hinges, are used to bias the respective vanes 5a, 5b, 5c to the upstanding positions.

A gas generator 9 is associated with the housing 1 and a gas outlet 10 direct gas into the widest part of the gas chamber 2.

The operation of the pretensioner will now be described with reference to the sequence drawings of FIGS. 1–6.

Figure 1:
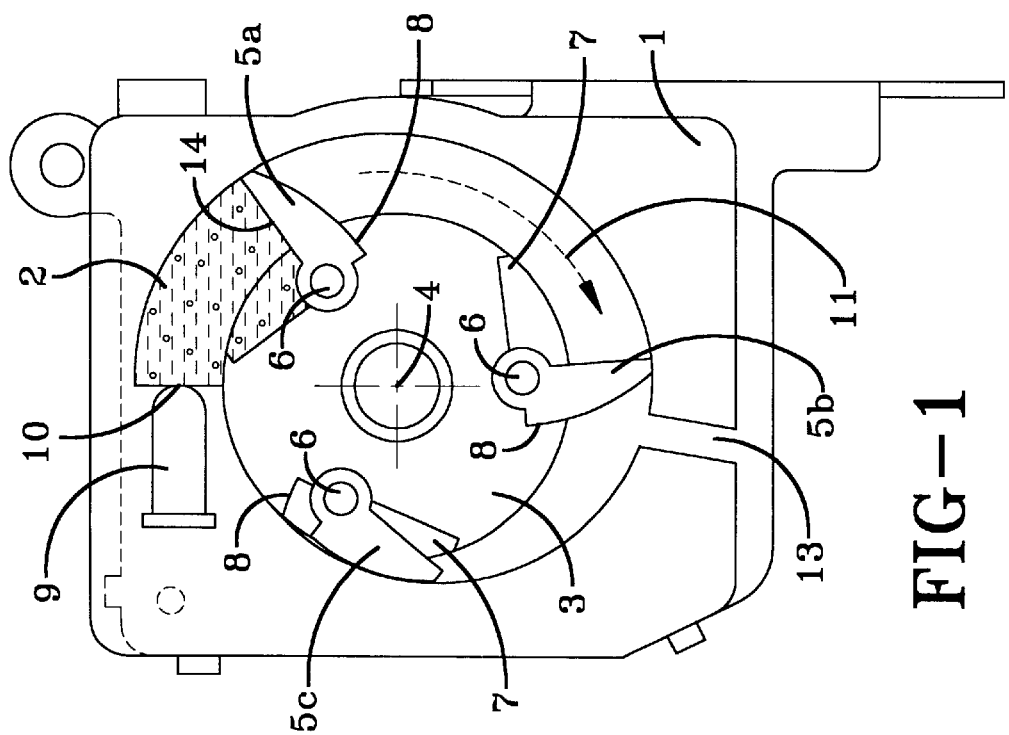

In the event of a crash, a sensor (not shown) generates a signal that activates the gas generator 9. Gas from the gas generator 9 flows into the gas chamber 2 between housing 1 and rotary member 3 and impinges on a face of an upstanding vane 5a as shown in FIG. 1. The pressure exerted by the gas generates a torque driving the rotary member in the direction of arrow 11 as shown in FIG. 2.

The turning rotation of the rotary member 3 causes a clutch to engage in known manner coupling a rotary member 3 to the retractor spool which then turns with the rotary member 3 and requires seat belt webbing to effect the pretensioning operation.

As shown in FIG. 3, as the rotary member 3 continues to turn, the second vane 5b passes a lip 12 defining the narrowest part of gas chamber passage 2 and the gas flow from the gas generator drives vane 5b into an upright position. A spring (not shown) may be mounted to each vane to assist this springing up motion that is illustrated in FIG. 4.

In FIG. 5 the vane 5b is fully upstanding and its face which is towards the gas generator now forms the load face of the pretensioner and the effective volume of the gas chamber 2 is reduced (compared to the volume at the stage shown in FIG. 4). Thus the torque on the rotary member increases, driving it faster than is possible with only one vane.

As the rotary member 3 turns faster, the first vane 5a passes the exhaust hole 13 as shown in FIG. 6 and the gas trapped between the first vane 5a and the second vane 5b will vent, thus reducing the gas pressure between these two vanes and further increasing the effect of the pressure in the gas chamber 2 on the vane 5b. The rotary member 3 continues to turn until the gas pressure is substantially exhausted. The only limit on the number of turns is the gas generating capability of the gas generator, since the successive formation of the effectively new gas compartments as the rotary member 3 turns, effectively gives a new lease on life at each change over, making the pretensioner extremely energy efficient compared to previous designs.

As each vane passes the exhaust hole 13, the passage gets narrower and the vane folds down on its hinge into its respective recess 7 until it passes the lip 12 again.

More than one gas generator could be used, either at the beginning of the passage or spaced around it so as to increase the pretensioning effect.

Figure 7:
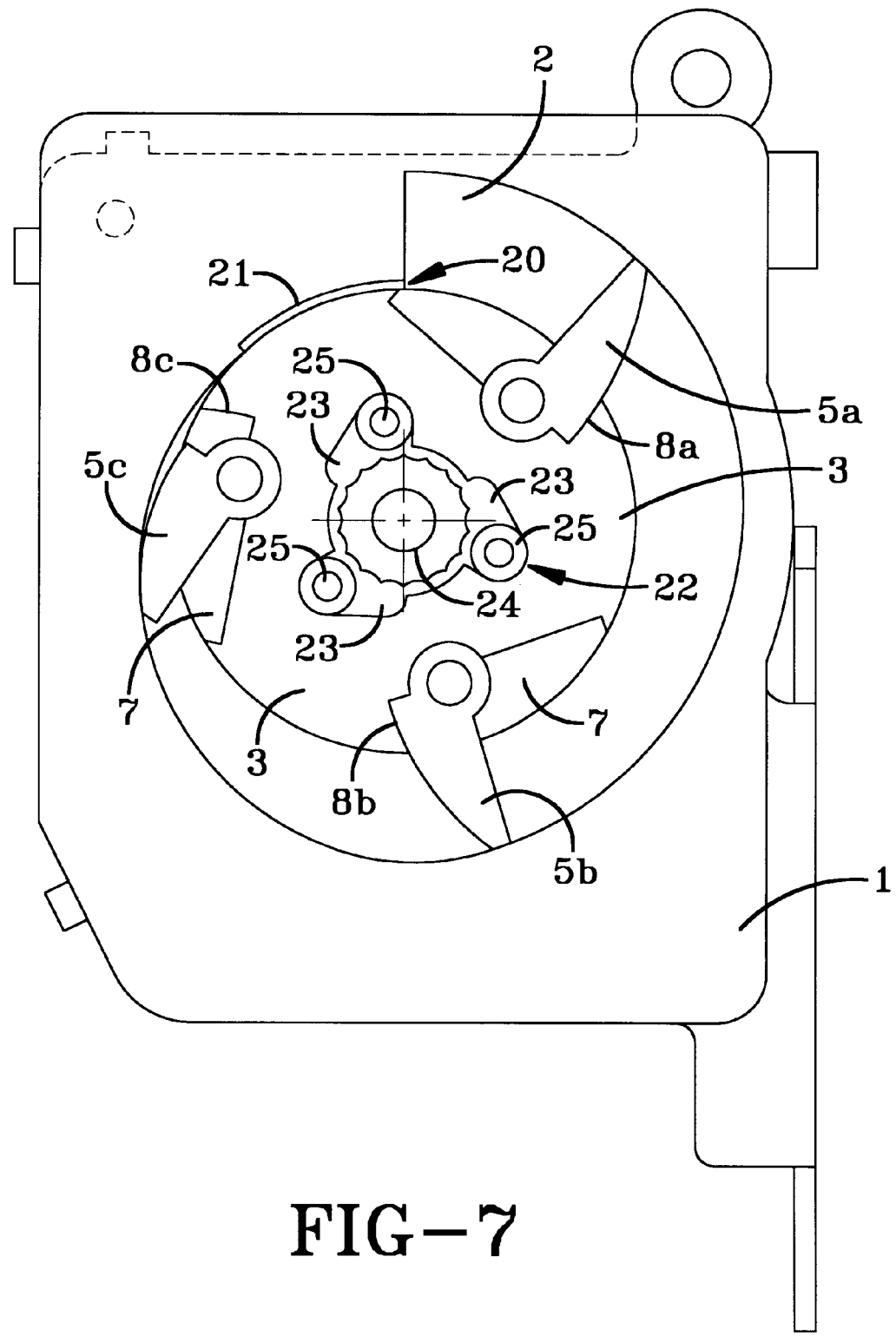
FIG. 7 shows a cross section of another seat belt pretensioner according to the invention.

FIG. 7 shows another embodiment of a pretensioner and like parts are referenced accordingly. The back wall stops 8a, 8b, 8c to respective recesses 7 are more clearly seen as is the abrupt step change in the radius of the gas chamber in the region 20 which may comprise an additional seal particularly along the circumferential periphery 21. In addition this figure shows a clutch 22 which brings the rotary member 3 into engagement with the retractor spindle 24. The clutch 22 may take many forms but in the embodiment of FIG. 7 is a roller clutch with three roller bodies 25 in tapering inner recesses 23 of the rotary member 3. When a crash is sensed and the gas generator starts to drive the rotary member via vane 5a, the roller bodies 25 are driven along the outer ramp faces of recesses 23 and engage the spindle 24 of the retractor spool so that the spool rotates with the rotary member.

Although the invention has been shown and described with respect to a best mode embodiment thereof, it should be understood by those skilled in the art that various other changes, omissions and additions thereto may be made therein without departing from the spirit and scope of the invention.

I claim:

1. A seat belt pretensioner comprising a rotary member which is connectable to a safety belt webbing retractor, a spool and a plurality of vanes hingedly attached to the rotary member at spaced positions around the circumference of the rotary member, the rotary member being rotatably mounted in a housing having a wall facing, and spirally formed with respect to, the rotational axis of the rotary member to form a circularly tapering gas chamber between the rotary member and the wall of the housing.

2. The seat belt pretensioner of claim 1 wherein the spiraling wall of the gas chamber has its smallest radius with respect to the axis of the rotary member substantially equal to the radius of the rotary member.

3. The seat belt pretensioner of claim 1 wherein the radius changes in a stepped manner and a seal is provided in the region of the step to further improve the chamber seal.

4. The seat belt pretensioner of claim 2 wherein the radius changes in a stepped manner and a seal is provided in the region of the step to further improve the chamber seal.

5. The seat belt pretensioner of claim 1 wherein a vent hole is provided at a position on the circumference of the wall of the housing circumferentially spaced from the gas generator.

6. The seat belt pretensioner of claim 2 wherein a vent hole is provided at a position on the circumference of the wall of the housing circumferentially spaced from the gas generator.

7. The seat belt pretensioner of claim 3 wherein a vent hole is provided at a position on the circumference of the wall of the housing circumferentially spaced from the gas generator.

8. The seat belt pretensioner of claim 4 wherein a vent hole is provided at a position on the circumference of the wall of the housing circumferentially spaced from the gas generator.

9. The seat belt pretensioner of claim 1 further comprising a plurality of gas generators located at circumferentially spaced positions around the housing.

10. The seat belt pretensioner of claim 1 having three vanes hinged to the outer circumference of the rotary member equidistantly spaced around its circumference, and the vent is provided generally at a position equivalent to 180° from the gas generator inlet into the passage defined by the housing wall and the rotary member.

11. The seat belt pretensioner of claim 2 having three vanes hinged to the outer circumference of the rotary member equidistantly spaced around its circumference, and the vent is provided generally at a position equivalent to 180° from the gas generator inlet into the passage defined by the housing wall and the rotary member.

12. The seat belt pretensioner of claim 3 having three vanes hinged to the outer circumference of the rotary member equidistantly spaced around its circumference, and the vent is provided generally at a position equivalent to 180° from the gas generator inlet into the passage defined by the housing wall and the rotary member.

13. The seat belt pretensioner of claim 4 having three vanes hinged to the outer circumference of the rotary member equidistantly spaced around its circumference, and the vent is provided generally at a position equivalent to 180° from the gas generator inlet into the passage defined by the housing wall and the rotary member.

14. The seat belt pretensioner of claim 5 having three vanes hinged to the outer circumference of the rotary member equidistantly spaced around its circumference, and the vent is provided generally at a position equivalent to 180° from the gas generator inlet into the passage defined by the housing wall and the rotary member.

15. The seat belt pretensioner of claim 6 having three vanes hinged to the outer circumference of the rotary member equidistantly spaced around its circumference, and the vent is provided generally at a position equivalent to 180° from the gas generator inlet into the passage defined by the housing wall and the rotary member.

16. The seat belt pretensioner of claim 7 having three vanes hinged to the outer circumference of the rotary member equidistantly spaced around its circumference, and the vent is provided generally at a position equivalent to 180° from the gas generator inlet into the passage defined by the housing wall and the rotary member.

17. The seat belt pretensioner of claim 8 having three vanes hinged to the outer circumference of the rotary member equidistantly spaced around its circumference, and the vent is provided generally at a position equivalent to 180° from the gas generator inlet into the passage defined by the housing wall and the rotary member.

18. The seat belt pretensioner of claim 9 having three vanes hinged to the outer circumference of the rotary member equidistantly spaced around its circumference, and the vent is provided generally at a position equivalent to 180° from the gas generator inlet into the passage defined by the housing wall and the rotary member.

* * * * *